Aug. 23, 1938. H. E. ALTGELT 2,127,579
TRACTOR IMPLEMENT
Original Filed Nov. 17, 1933 4 Sheets-Sheet 1

Inventor:
Herman E. Altgelt,
By John P. Smith Atty.

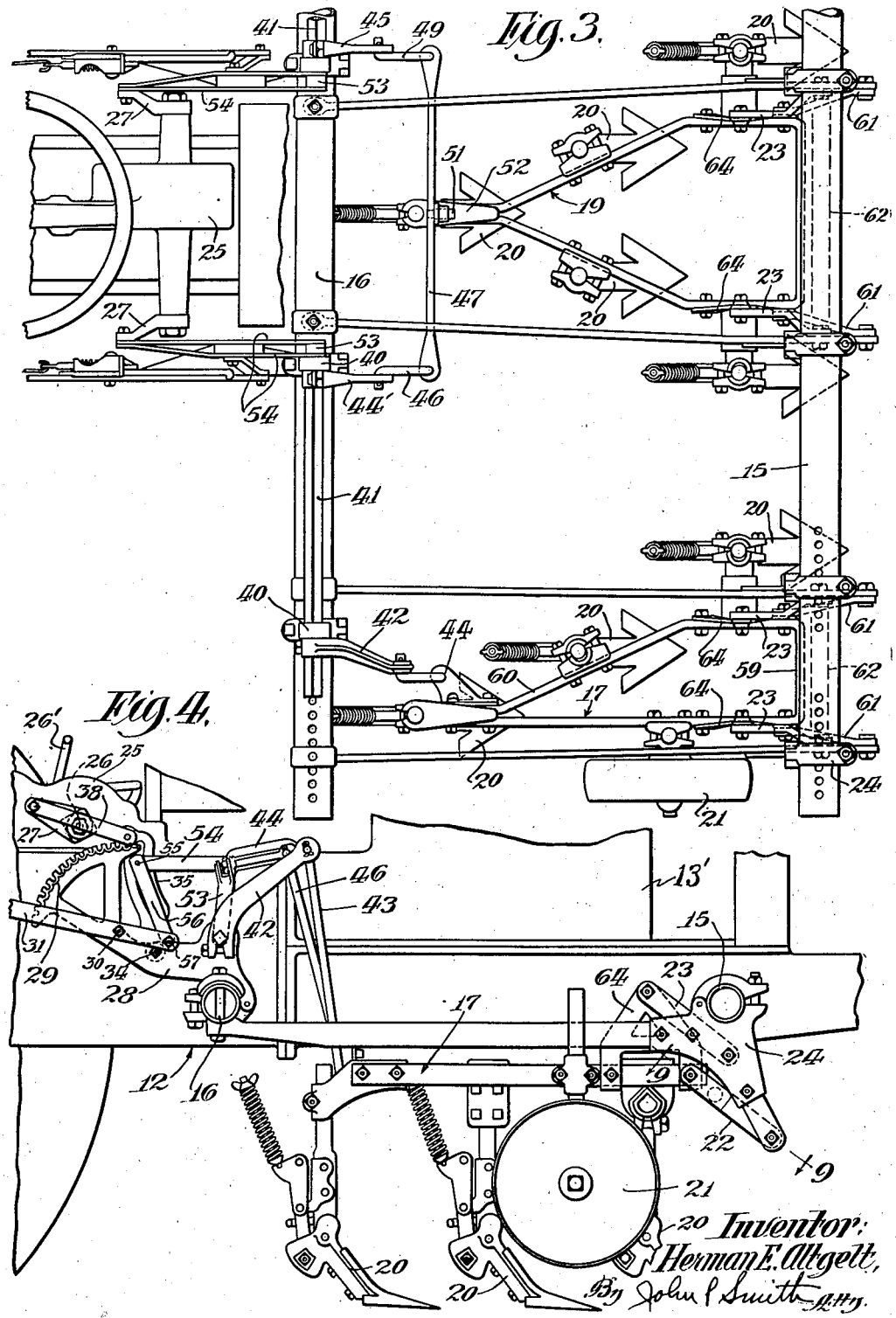

Aug. 23, 1938.   H. E. ALTGELT   2,127,579
TRACTOR IMPLEMENT
Original Filed Nov. 17, 1933   4 Sheets-Sheet 3
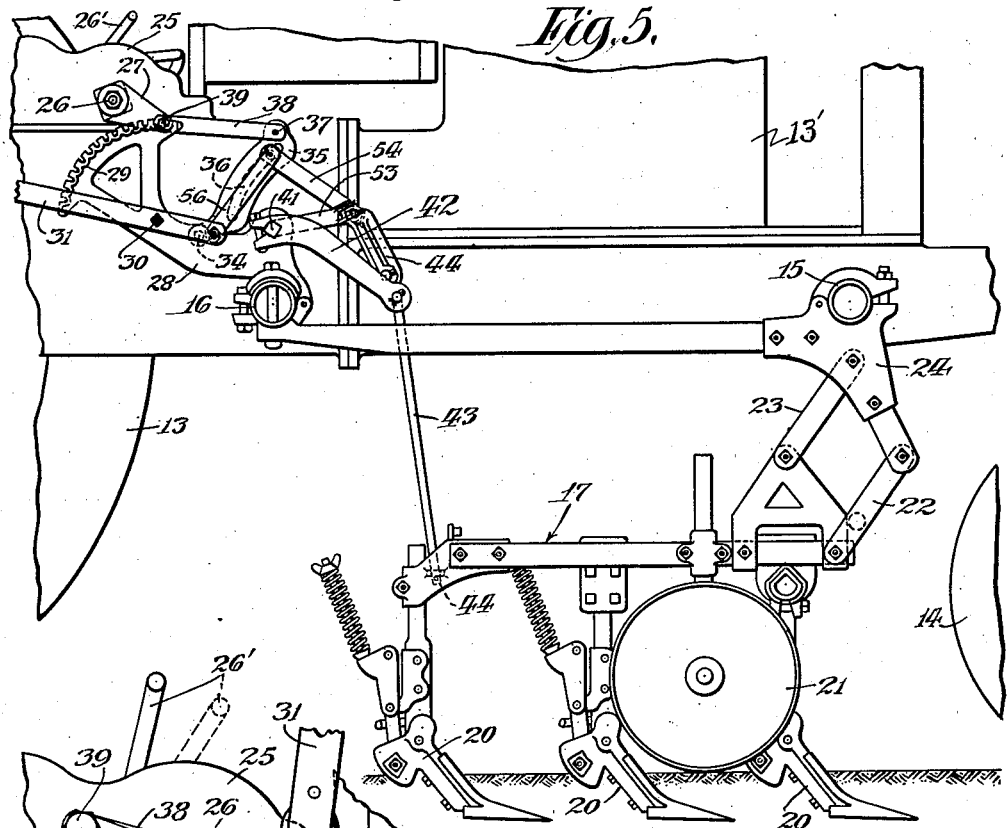
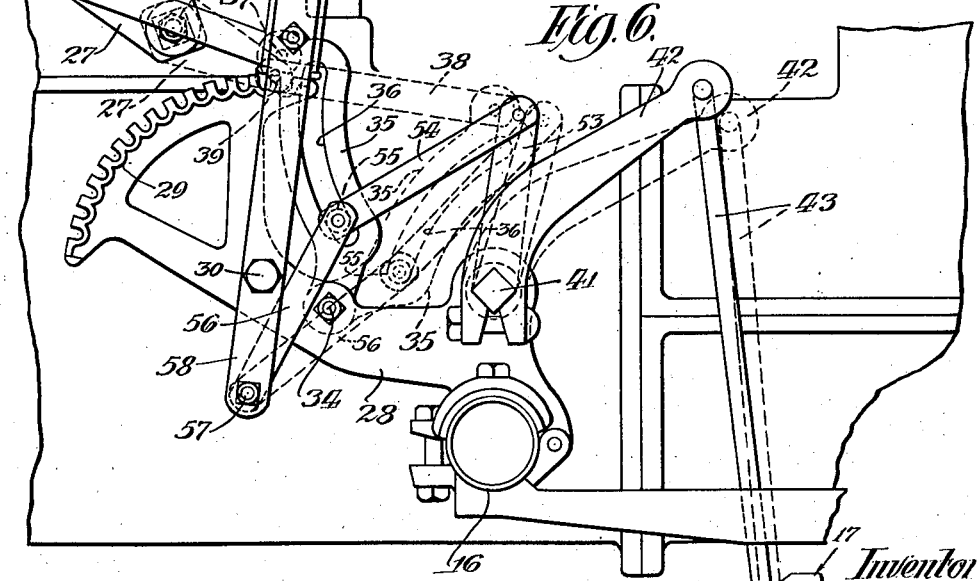
Inventor:
Herman E. Altgelt,
By John P. Smith, Atty.

Aug. 23, 1938. H. E. ALTGELT 2,127,579
TRACTOR IMPLEMENT
Original Filed Nov. 17, 1933 4 Sheets-Sheet 4
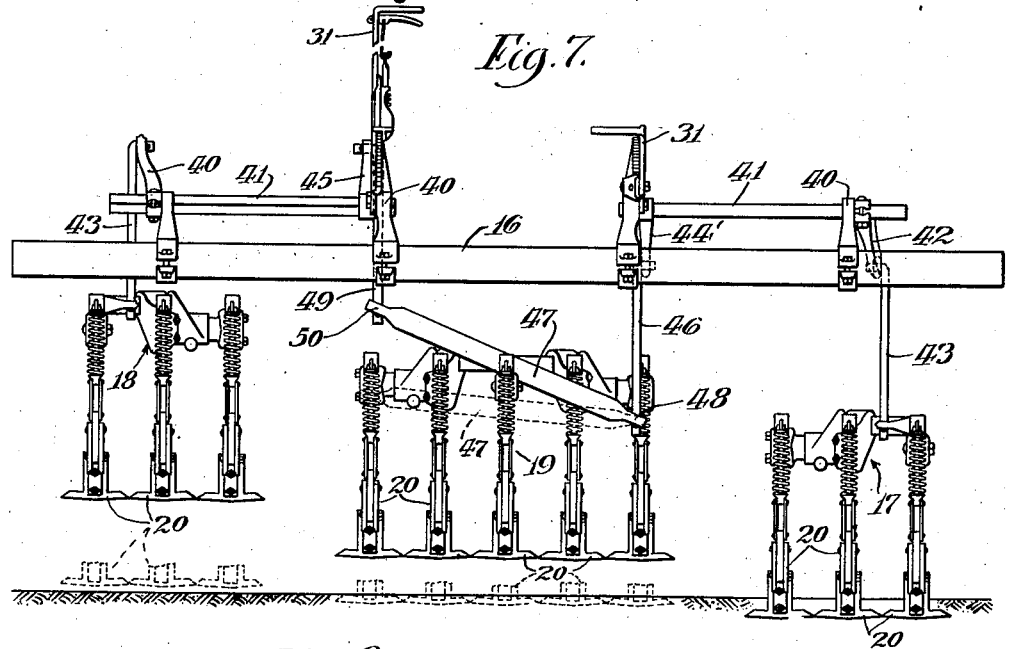
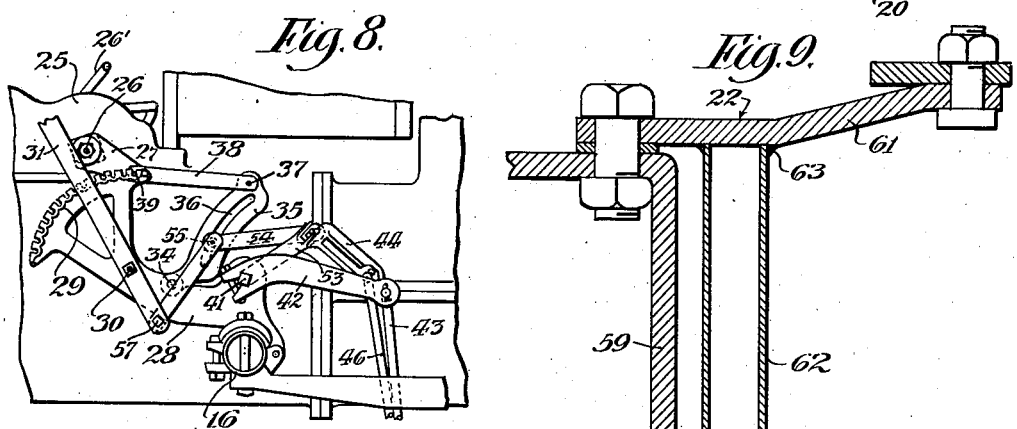
Inventor:
Herman E. Altgelt,
By John P. Smith
Atty.

Patented Aug. 23, 1938

2,127,579

UNITED STATES PATENT OFFICE 2,127,579

TRACTOR IMPLEMENT

Herman E. Altgelt, South Bend, Ind., assignor to Oliver Farm Equipment Company, a corporation of Delaware Application November 17, 1933, Serial No. 698,400
Renewed March 29, 1937

29 Claims. (Cl. 97—50)

The present invention relates generally to tractor implements, but more particularly to a planting or cultivating attachment for a tractor, in which a plurality of earth working units may be raised or lowered by the power of the tractor or in which certain of the units may be lowered by the power of the tractor independent of certain other units.

Under ordinary circumstances, the tractor implements of the earth working unit type, such for example, as the planting and cultivating attachments arranged in units or gangs on the opposite sides of the tractor, are raised or lowered simultaneously. However, in the irregularly shaped field, it frequently becomes necessary or desirable to carry certain of the units or implements on one side of the tractor in a raised or inoperative position, while the units or implements on the other side of the tractor are in their lowered or operating position. Also, in many fields under cultivation there are irrigation ditches, roads and many other reasons which makes it highly desirable to have the units or implements on one side of the tractor in a raised or inoperative position while the ones on the other side are in their lowered or working position.

It is, therefore, the primary object of the present invention to provide a novel adjustment within easy reach of the operator's seat on the tractor, to render the power lift substantially inoperative on one side of the tractor and permit the implements on the other side of the tractor to be lowered into operative position while maintaining the other implements in an elevated or inoperative position.

Another object of the invention has particular reference to manually operable adjustment located on the opposite sides of the tractor for rendering the power lift mechanism inoperative on one side or the other to lower certain cultivating gangs or other earth working units with respect to the tractor. This novel adjusting arrangement of the power lift mechanism also permits the center gang, as well as one of the outside gangs, to be in operative position or ground engaging position, while the other outside gang may be in raised or in an inoperative position by adjusting one of the levers to an intermediate position.

A still further object of the invention is to provide a novel and improved lifting mechanism for a plurality of earth working units attached to a tractor in which a unit is located on each side of the tractor and operatively connected with a center unit beneath the tractor so that either of the outside units may be in its operative or ground engaging position while the other two units are in their inoperative or raised position. Or, if desirable, the center units and either one of the outside units may be in their operative or ground engaging position, while one of the outside units may be in its raised or inoperative position.

A further object of the invention is to provide a novel manually operable adjusting mechanism which is not only capable of rendering the power lift mechanism ineffective to lift the earth working implements, but is also capable of manually adjusting the implements from elevated or inoperative position to ground engaging position independently of the power lift mechanism.

A still further object of the invention is to provide a novel and improved earth working unit frame and its attachments to the tractor.

These and other objects are accomplished by providing a construction and an arrangement of the various parts in the manner hereinafter described and particularly pointed out in the appended claims.

Referring to the drawings:

Fig. 3 is a fragmentary enlarged detailed view showing the construction and frame units of a cultivating gang and particularly the manner in which the center unit is connected thereto;

Fig. 4 is a side elevational view of the construction shown in Fig. 3 with the units raised in their inoperative position;

Fig. 5 is a fragmentary view of the tractor showing the units in their lowermost operative position;

Fig. 6 is an enlarged detailed view showing one of the levers in forward position on the tractor for holding the gangs in that side of the tractor in its raised or inoperative position.

Fig. 7 is a rear elevational view of the three gang frames or units showing the manner in which one of the gang frames or units may be lowered on one side of the tractor into engagement with the ground while maintaining the center and other outside unit out of engagement with the ground;

Fig. 8 is a fragmentary detailed view showing the manner in which one of the levers may be adjusted on one side of the tractor, in its intermediate position for permitting the center gang frame and one of the outside gang frames to be lowered into ground engaging position while retaining the other gang frame in its inoperative position or out of engagement with the ground;

Fig. 9 is an enlarged detailed view in cross section showing one set of the connecting parallel links for the gang frames; and Fig. 10 is a perspective view of one set of the links.

The invention in the present instance is an improvement over my co-pending application, Serial No. 683,949, filed August 7, 1933 on a Tractor power lift implement.

Figure 1:
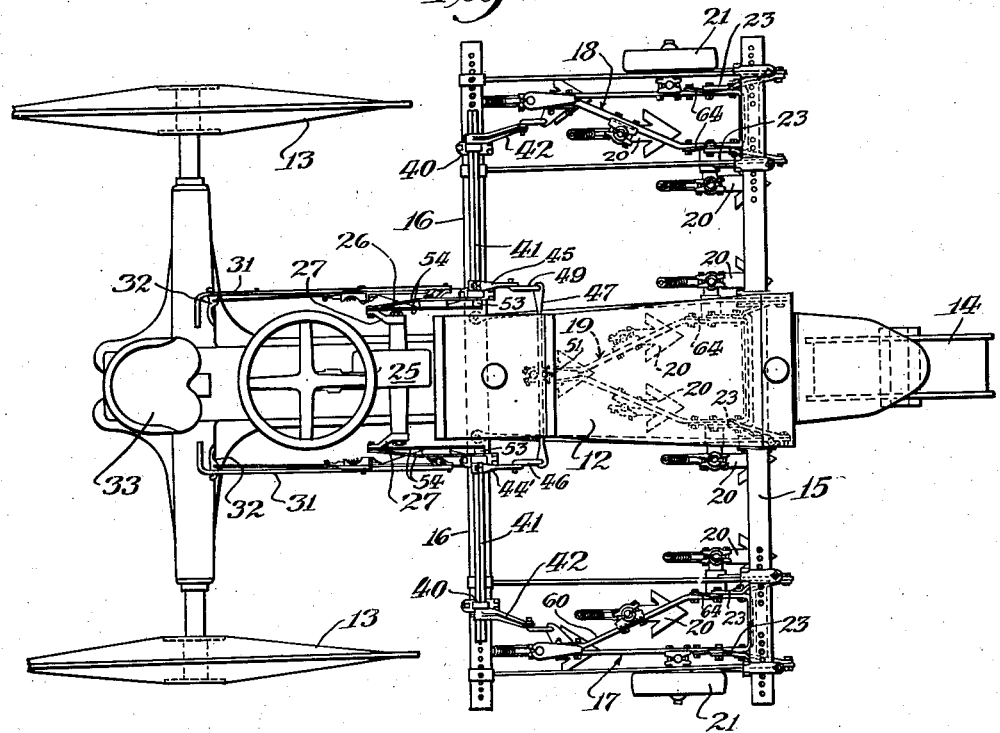
Fig. 1 is a top plan view of a conventional form of tractor and implement attachment having my invention embodied therein.
Figure 2:
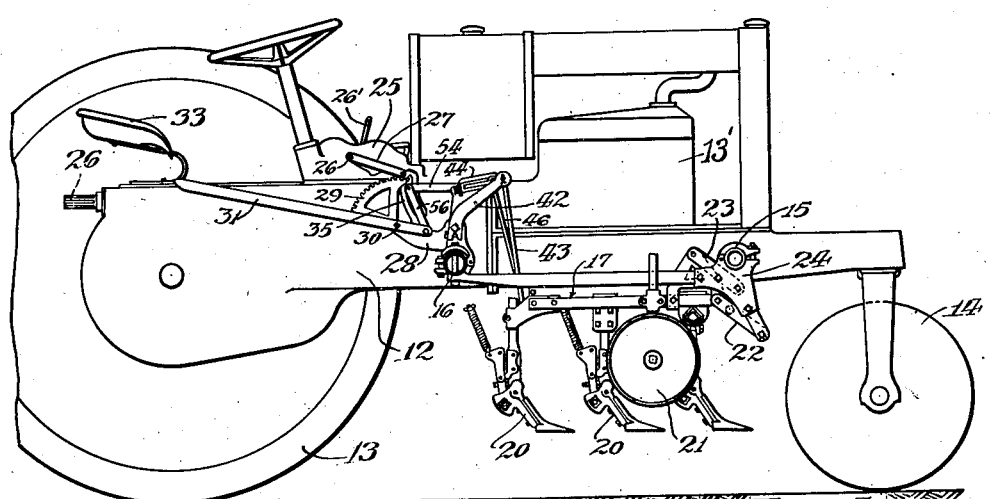
Fig. 2 is a side elevational view of the same.

In illustrating one embodiment of my invention, I have shown the same in connection with the conventional form of general purpose tractor, generally indicated by the reference character 12, which is supported at its rear end with the usual widely spaced apart rear traction wheels 13 and supported at the front end by dirigible front steering wheel 14, which is located in the longitudinal center of the tractor. The tractor is propelled by the usual engine or motor as shown at 13'. Secured to the front portion of the tractor frame, adjacent to and rearwardly of the axis of the front steering wheel, is a forward transversely extending implement supporting beam or pipe 15. Secured to the intermediate portion of the frame of the tractor and rearwardly from the beam 15 is a second transversely extending rear implement supporting beam 16. For the purpose of illustration, I have shown in the drawings, three separate units or cultivating gangs anchored to these beams, but it will of course, be understood that other units or other types of earth working implements may be substituted therefor and I, therefore, do not wish to restrict my invention with respect to the type of implement attached thereto. In the drawings I have shown outside cultivating gangs, generally indicated by the reference characters 17 and 18, which are located laterally of the frame of the tractor and in substantial alignment with the tread of the rear traction wheels, while a center cultivating gang, generally indicated by the reference character 19, is located in the longitudinal center of the tractor beneath the tractor frame. Each of these gangs 17, 18 and 19 is provided with the regularly staggered and spaced apart pivoted shoes 20 of the conventional form. The two outside gangs 17 and 18 are provided with adjustable gauge wheels, generally indicated by the reference character 21, for regulating and controlling the depth penetration of the shoes into the ground. The front ends of these gangs are pivotally connected by parallel link members 22 and 23 to the front supporting beam 15 through the medium of hanging brackets 24 attached to the forward transverse beam 15. The specific structure of certain of these parallel links and gang frames will be hereinafter more fully described. These gang frames are raised and lowered by a power take-off mechanism located within a housing, generally indicated by the reference character 25. The detail construction of this power lift mechanism is described and claimed in my aforementioned co-pending application and suffice it to say that it derives its power from the power take-off shaft (not shown) which, in turn, is geared to the transmission mechanism of the tractor and operatively driven by the engine thereof. The power take-off mechanism per se forms no part of the present invention except insofar as it cooperates with my improved hand lever operating mechanism hereinafter described. This power lift mechanism is arranged to intermittently drive a transverse clutch shaft 26, to the opposite ends of which are secured cranks 27. These cranks 27 as viewed in Fig. 1 of the drawings, are located on the opposite sides of the tractor. Secured to the rear supporting beam 16 adjacent to and on the opposite sides of the tractor frame are sector brackets 28. Formed integrally with each of the sector brackets are arcuately arranged sector teeth 29. Pivoted on bolts 30 are upwardly extending hand levers 31, which, in turn, are provided with the usual detent mechanism 32 for locking the levers in various positions of adjustment in the teeth 29 of the sector. These levers are located on the opposite sides of the tractor within easy reach of the operator's seat 33 on the rear portion of the tractor frame. Pivoted on bolts 34 to each of the sector brackets 28 is a lever 35 which in turn is provided with an arcuately arranged slot 36. The upper free ends of these levers 35 are pivotally connected, as shown at 37, by links 38 to the outer or free ends of each of the cranks 27, as shown at 39. Journaled in suitable bearings 40, secured to the transverse supporting beams 16, are rock shafts 41, which are located on the opposite sides of the tractor directly above the transverse beam 16. Secured to the outer ends of each of the rock shafts 41 are lifting crank arms 42, which in turn, have their free ends connected by a connecting rod 43 to their respective outside gang frames 17 and 18 as shown at 44. Secured to the inner ends of each of the rock shafts 41 adjacent the tractor frame, are lifting crank arms 44' and 45. The free end of the crank 44' is connected by means of a connecting rod 46 to one end of an equalizing bar 47 as shown at 48. The other crank 45 is connected by a connecting rod 49 to the other end of the equalizing bar 47 as shown at 50. (See Figs. 3 and 7.) Pivotally connected to the center portion of the equalizing bar 47 by means of a pin 51, is a bracket 52, which in turn, is secured to the rear end of the center gang frame 19, as clearly shown in Fig. 3 of the drawings. Secured to the inner ends of each of the rock shafts 41 are upwardly extending cranks 53 which have their free ends connected by means of links 54 to the opposite sides of rollers adapted to travel in the arcuate slots 36 of each of the levers 35. The links 54 are arranged in the form of two straps located on the opposite sides of the levers 35 and cranks 53. Connected to the rear ends of the links 54 are link connections 56, which in turn, have their lower ends connected as shown at 57 to the lower portions of the levers 31.

From the above description it will be obvious that should the operator be desirous of lowering the cultivating gangs only on one side of the tractor, one of the levers 31 on one side of the tractor is adjusted forwardly to its foremost position or to the position shown in Fig. 6 of the drawings, while the lever 31 on the other side is pushed rearwardly to its rearmost position, or the position shown in Fig. 5 of the drawings. The adjustment of the lever 31 to the full line position in Fig. 6 causes the rear end of the link 54 to be moved to the lower end of the slot 36 in the pivoted lever 35, as shown in this figure. Then, upon an actuation of the trip lever 26' controlling the clutch shaft 26, the shaft and crank 27 are revolved from the full line position to the dotted line position shown in Fig. 6. Through the connecting link 38, the pivoted lever 35 is moved from the full line position to the dotted line position shown in this figure, therefore rendering the movement of the crank 27 from its full line to the dotted line position in this figure, ineffective to lower the crank arm 42 except for the slight movement as is indicated by the dotted lines in this figure. Obviously this arrangement maintains one of the gangs, as shown at 18 in Figs. 3 and 7 of the drawings, in elevated or inoperative position and permitting the cultivating gang 17 to be lowered to its operative position in engagement with the ground, while the center gang is maintained in an intermediate position but out of engagement with the ground.

Another essential feature of the invention involves the special gang frame structure of each of the cultivating gangs together with a novel form of welded links for supporting these gang frames. The two outside gang frame units 17 and 18 have their main frames made of a single flat bar in which the forward ends are bent in substantially U-shaped form as shown at 59, with one of the rear ends thereof extending diagonally and rearwardly converging toward the rear, as shown at 60. The center gang frame member 19 is substantially the same structure, except that the U-shaped portion thereof is substantially wider and has its two ends converging towards each other and secured at rearmost ends, as clearly shown in Fig. 3 of the drawings. All of these gang frames are provided with a special form of lower links which form the parallel link arrangement as clearly shown in Figs. 9 and 10 of the drawings. This lower link is made up of two sets of link members, as shown at 61, and have their intermediate portions thereof connected together by a pipe 62 which has its opposite ends welded as shown at 63 to the respective links. The free ends of these sets of parallel links are pivotally connected to each of the cultivating gang frames. This particular set of links for the center gang frame is essentially the same as that for the outside gang frames except for the pipe extending between the specific links is a little longer, as clearly shown in Fig. 3 of the drawings. The upper set of links 23 for each of the gang frames of course is arranged parallel to the links 22 and are pivoted at their forward ends to their respective brackets 24. The rear ends of these links, in turn, are pivotally connected in substantially triangular shaped and upwardly extending brackets 64, which in turn, are secured to the side portions adjacent the forward end of each of the gang frames.

Briefly, the operation of my improved hand lever adjustment for controlling the elevating and lowering of the implements attached to the tractor by the power thereof is as follows:

It is obvious that should the operator of the tractor be desirous of raising or lowering all of the cultivating gangs, namely the two outside and center gangs, simultaneously, the trip lever 26' is manipulated to trip the clutch shaft 26 and cause it to revolve a half revolution from the position shown in Fig. 4 to that shown in Fig. 5. With both levers 31 on each side of the tractor in their rearmost position, all of the cultivating gangs will be lowered, or upon a trip of the lever 26' from the position shown in Fig. 5 the cranks 27 will make a half revolution to elevate the gang to the position shown in Fig. 4. Should the operator be desirous of lowering only one of the outside gang frames, for example, the gang frame indicated by the reference character 17 on the right hand side of the tractor, the lever 31 on the left hand side of the tractor is shifted forwardly and locked in the sector 28 in the position shown in Fig. 6 of the drawings. In so doing, it will be noted that by reason of the link 56 connected to the lower end of the lever 31 as shown at 57, the links 54 will be moved downwardly into the lower portion of the slot 36 of the lever 35 as clearly shown in full line in Fig. 6 of the drawings. Then, upon the actuation of the clutch shaft 26, the crank 27 will be actuated from the full line position to the dotted line position shown in Fig. 6, thereby actuating the lever 35 to the dotted line position. It will be noted that by reason of the links 54 being held down in the lower portion of the slot 36 of the lever 35, the crank 42 will be restricted or limited to the slight movement indicated by the dotted line in this figure, thereby holding the cultivating gang frames 18 in its elevated position as shown in Fig. 7 while permitting the gang frame 17 to be lowered into engagement with the ground. In this connection it will be noted, by referring to Fig. 7 of the drawings, that the center cultivating gang, indicated by the reference character 19, by reason of the equalizing member 47, will be maintained in an intermediate raised position between the positions shown by the gang frames 17 and 18. In this intermediate position, the center gang frame, however, is maintained out of engagement with the ground. Should the operator, however, desire to have the cultivator gang 17 and the center cultivator gang 19 lowered to their operative position while holding the right hand cultivator gang 18 out of engagement with the ground, the lever 31 on the left hand side of the machine may be adjusted to an intermediate position, or a position similar to that shown in Fig. 8 of the drawings, in which case, the right hand gang 17 will be lowered to ground engaging position while the left hand gang 18 will be lowered to an intermediate position between the two outside gangs, in which position it will engage the ground as shown in the dotted line position in Fig. 7 of the drawings.

It will also be observed that all of the gangs 17 18 and 19 may be manually adjusted through the medium of the two hand levers 31 independently of the power lift mechanism or the manipulation of these levers 31 to various intermediate adjustments may regulate the depth penetration of the earth working tools into the ground.

From the above description it will be readily seen that I have not only provided a simple lever adjustment for rendering the power lift of the tractor ineffective for operating the implement unit on one side of the tractor, but I have also provided an arrangement which permits an adjustment of the unit under the tractor so that it may be effectively adjusted to be raised or lowered into operative or inoperative position in combination with either of the units on one side or the other of the tractor. It will also be noted that by reason of welding the parallel links together, particularly the lower links, and pivotally connecting them to a substantially triangular frame, a substantially rigid construction is provided which reinforces the links and connections to the supporting beams as well as the individual cultivating frame structure.

While in the above specification I have described one embodiment which my invention may assume in practice, it will of course, be understood that modification may be made without departing from the spirit and scope of the invention as expressed in the following claims.

What I claim is my invention and desire to secure by Letters Patent is:

1. The combination with a tractor having front steering and rear traction means, an implement supporting beam arranged transversely with respect to and carried by said tractor, a cultivating gang frame carried by said beam comprising a substantially U-shaped forward portion and converging rear portion, parallel link mechanism including pairs of parallel links pivotally connecting the forward end of said gang frame to said transverse implement supporting beam, and means for rigidly securing an intermediate portion of said lower parallel links together.

2. The combination with a tractor having front steering and rear traction means, implement supporting beams arranged transversely with respect to and carried by said tractor, a cultivating gang frame carried by said beams comprising a substantially U-shaped forward portion and converging rear portion, parallel link mechanism including pairs of parallel links pivotally connecting the forward end of said gang frame to a forward transverse implement supporting beam, and a welded connection between the two pairs of lower parallel links for reinforcing the parallel link mechanism.

3. The combination with a tractor including front steering means, rear traction means, a motor, of a power take-off shaft, a clutch shaft located in substantially the transverse and longitudinal center of said tractor and intermittently driven by said motor, earth working units carried by said tractor and extending longitudinally from a point adjacent the front end thereof to a point adjacent the center thereof, positively driven connections between said units and clutch shaft for simultaneously raising or lowering all of said units, and manually operable means including a part of said connections for raising or lowering said units from ground engaging position to an elevated inoperative position or vice versa independent of said clutch shaft.

4. The combination with a tractor including front steering means, rear traction means, a motor and power take-off, a clutch shaft mounted on said tractor and driven by said motor, cranks secured to the opposite sides of said crank shaft, rock shafts located on the opposite sides of said tractor and connected to said cranks, an earth working unit carried by and located under the tractor, and an equalizing member having an intermediate portion pivotally connected to the unit under the tractor and its outer ends connected to said rock shafts.

5. The combination with a tractor having front steering and rear traction means, implement anchoring means carried by the tractor, a cultivating gang frame carried by said anchoring means comprising a substantially U-shaped forward portion and converging rear portion, parallel link mechanism including pairs of parallel links pivotally connecting the forward end of said gang frame to said anchoring means, and a welded connection between the two pairs of lower parallel links for reinforcing the parallel link mechanism.

6. The combination with a tractor having front steering and rear traction means, of a motor and a power take-off shaft, a power lift mechanism including a clutch shaft intermittently driven by said motor, earth working units carried by said tractor, connections between said units and said clutch shaft including a slotted lever pivotally carried by said tractor, a link operatively connecting the free end of said lever with said clutch shaft, a second link movably connected to the slot in said lever and operatively connected to one of said earth working units, and means connected to said last named link for adjusting its position with respect to said slotted lever for rendering the clutch shaft ineffective to lower said unit from a raised inoperative position to ground engaging position.

7. The combination with a tractor having front steering and rear traction means, of a motor and power take-off shaft, a power lift mechanism including a clutch shaft intermittently driven by said motor, cranks secured to the opposite ends of said shaft and located on the opposite sides of said tractor, earth working units carried by said tractor, connections between said cranks and the respective units on each side of said tractor including slotted levers pivotally mounted on said tractor, links connecting the free ends of said levers with each of said cranks, links adjustably connected to the slot in each of said levers and operatively connected to the units on the respective sides of said tractor, and means connected to said adjustable links whereby said power lift mechanism may be rendered substantially ineffective to lower the earth working units on either side of the tractor.

8. The combination with a tractor having front steering and rear traction means, of a motor and a power take-off shaft, a power lift mechanism including a clutch shaft intermittently driven by said motor, cranks secured to the opposite ends of said shaft and located on the opposite sides of said tractor, earth working units carried by said tractor, connections between said units and said cranks including levers pivotally mounted on the opposite sides of and carried by said tractor, links operatively connecting the free ends of said levers with the respective cranks, a second set of links having one of their ends adjustably connected to said levers and operatively connected to the earth working units at the other ends thereof, and manually operable levers located on the opposite sides of said tractor and connected to said last named links whereby said power lift mechanism may be rendered inoperative to lower either of said earth working units to ground engaging position.

9. The combination with a tractor including front steering means, rear traction means, of a motor and a power take off shaft, a clutch shaft intermittently driven by said motor, a crank secured to one end of said shaft, earth working units carried by said tractor, operative connections between said units and said crank including separate levers pivotally carried by said tractor for raising and lowering said units, certain of said connections being adjustable with respect to said levers, and means for adjusting said last named connection with respect to said levers for rendering said clutch shaft substantially ineffective to lower said units.

10. The combination with a tractor including front steering means, rear traction means, of a motor and a power take off shaft, a clutch shaft intermittently driven by said motor, cranks secured to the opposite ends of said shaft, earth working units carried by and on the opposite sides of said tractor, connections between said units and said cranks including slotted levers pivotally carried by said tractor for raising and lowering said units, certain of said connections being adjustable with respect to said levers, and manually controlled means for adjusting said adjustable connections with respect to said levers for rendering said clutch shaft substantially ineffective to lower said units.

11. The combination with a tractor including front steering means, rear traction means, of a motor and a power take off shaft, a clutch shaft intermittently driven by said motor, cranks secured to the opposite ends of said shaft, earth working units carried by and on the opposite sides of said tractor, operative connections between said units and said cranks including levers pivotally carried by said tractor for raising and lowering said units, certain of said connections being adjustable with respect to said levers, and manually controlled means associated with said last named connections for rendering said clutch shaft substantially ineffective to lower said units.

12. The combination with a tractor including front steering means, rear traction means, of a motor and a power take off shaft, a clutch shaft adapted to be intermittently driven a half revolution at a time by said motor, cranks secured to the opposite ends of said shaft, earth working units carried by and on the opposite sides of said tractor, relatively movable connected links between said units and said cranks including levers pivotally carried by said tractor for raising and lowering said units, the pivot point of certain of said links being adjustable with respect to said levers, and separate manually controlled means for changing the position of the pivot of said last named link with respect to said clutch shaft for rendering said levers substantially ineffective to lower any one or both of said units.

13. The combination with a tractor including front steering means, rear traction means, of a motor and a power take off shaft, a clutch shaft mounted on said tractor and intermittently driven by said motor, cranks secured to the opposite sides of said clutch shaft, earth working units carried by and arranged on the opposite sides of said tractor, operative connections positioned between said cranks and said units including levers pivotally carried by said tractor for raising and lowering said earth working units, certain of said connections being adjustable with respect to said levers, and separate manually controlled hand operated levers between each of said units and the respective cranks for changing the position of certain of said adjustable connections with respect to said first named levers for rendering said clutch shaft substantially ineffective to lower either one of said units.

14. The combination with a tractor including front steering means, rear traction means, of a motor and a power take off shaft, a clutch shaft mounted on said tractor and operatively driven by said motor, cranks secured to the opposite ends of said clutch shaft and located on the opposite sides of said tractor, earth working units carried by and located on the opposite sides of said tractor, levers pivotally carried by said tractor, links connecting said levers with said cranks, connections between the respective levers and said units, certain of said connections being adjustable with respect to said levers, and separate manually operable levers for adjusting certain of said connections with respect to said first named levers for rendering said connections substantially ineffective to lower either of said units upon the actuation of said clutch shaft.

15. The combination with a tractor including front steering means, rear traction means, of a motor and power take off shaft, a power lift mechanism including a clutch shaft intermittently driven by said motor, earth working units carried by said tractor, connections between said units and said clutch shaft including a plurality of relatively movable links, a lever pivotally carried by said tractor and having its free end pivotally connected to certain of said links, and means for shifting the pivot of one of said links with respect to the pivot of said lever for lowering certain units from elevated inoperative position to ground engaging position independent of said power lift mechanism.

16. The combination with a tractor including front steering means, rear traction means, of a motor and power take off shaft, a power lift mechanism including a clutch shaft intermittently driven by said motor, earth working units carried by said tractor, connections between said units and said clutch shaft including a plurality of relatively movable links, a lever pivotally carried by said tractor and having its free end pivotally connected to certain of said links, one end of one of said last named links being adjustable to and from the pivot of said lever, and a manually operable lever connected to said last named link to shift one end thereof for lowering certain of said units from elevated inoperative position to ground engaging position independent of said power lift mechanism.

17. The combination with a tractor including front steering means, rear traction means, of a motor and a power take off shaft, a power lift mechanism including a clutch shaft intermittently driven by said motor, earth working units carried by said tractor, connections between said units and said clutch shaft including a plurality of relatively movable links, a lever pivotally carried by said tractor and having its free end pivotally connected to certain of said links, and manually operable means connected to one end of one of said last named links for shifting the same with respect to the pivot of said lever whereby said power lift mechanism is rendered substantially ineffective to lower said units.

18. The combination with a tractor including front steering means, rear traction means, a motor, of a power take-off shaft, a clutch shaft mounted on said tractor, and driven by said motor, cranks secured to the opposite ends of said clutch shaft, rock shafts located on the opposite sides of said tractor, earth working units carried by and located on the opposite sides of said tractor, an earth working unit carried by and located under said tractor, connections between said outside units and said rock shafts, an equalizing connection between said center unit and each of said rock shafts, and operative connections between said cranks and each of said rock shafts, and separate manually controlled means between said cranks and each of said rock shafts for rendering said clutch shaft substantially ineffective to lower certain of said outside units with said center unit while permitting the other of said units to be lowered into engagement with the ground.

19. The combination of a tractor including front steering means, rear traction means, a motor, of a power take off shaft, a clutch shaft adapted to be intermittently driven by said motor, cranks secured to the opposite ends of said clutch shaft and located on the opposite sides of said tractor, cultivating gangs located in alignment with the rear traction means, a center cultivating gang carried by said tractor and located beneath the same, operative connections located on the opposite sides of said tractor connecting said cranks with the rear ends of all of said cultivating gangs for raising and lowering the same, an equalizing member pivotally connected to the center gang frame and operatively connected to said connections, and manually controlled means located on the opposite sides of said tractor for adjusting said connections for rendering said cranks ineffective to lower certain of said gangs to their operative positions.

20. The combination with a tractor including front steering means, rear traction means, a motor, of a power take-off shaft, a clutch shaft mounted on said tractor and adapted to be intermittently driven by said motor, front and rear transversely extending implement supporting beams secured to said tractor, cultivating gangs carried by said supporting means, one of said gangs located in the center beneath said tractor, parallel link mechanism pivotally connecting the front ends of said gangs to one of said supporting beams, rock shafts mounted on one of said supporting beams and located on the opposite sides of said tractor, operative connections between said rock shafts and said cultivating gangs, cranks secured to the opposite ends of said clutch shaft, operative connections between said cranks and said rock shafts, and manually adjustable means located on the opposite sides of said tractor and connected to the connections between said cranks and said rock shafts for rendering said cranks substantially ineffective to lower certain or all of said cultivating gangs.

21. The combination with a tractor including front steering means, rear traction means, a motor, of a power take-off shaft, a clutch shaft mounted on said tractor and adapted to be intermittently driven by said motor, a crank secured to one end of said clutch shaft, a cultivating gang carried by said tractor and adapted to be adjusted vertically with respect thereto, a rock shaft carried by said tractor and operatively connected to one end of said cultivating gang, a sector carried by said tractor, an operating lever pivoted to said sector, a slotted lever pivoted to said sector, a link connecting said slotted lever to said crank, a link connection operatively connecting said slotted lever to said rock shaft, a link pivotally connecting the free end of said last named link to said lever for rendering said clutch shaft ineffective to lower said cultivating gang when said hand operating lever is in a predetermined position.

22. The combination with a tractor including front steering means, rear traction means, a motor, of a power take-off shaft, a clutch shaft intermittently driven by said motor, spaced apart front and rear transversely extending implement supporting beams carried by said tractor, a plurality of spaced apart cultivating gangs carried by said beams, parallel link mechanism forming the pivotal connection between one of said beams and said cultivating gangs, one of said cultivating gangs located in the longitudinal center beneath said tractor, a rock shaft pivoted on each side of said tractor and above said rear supporting beam, operative connections between said rock shafts and said outside cultivating gangs, an equalizing member having its intermediate portion pivotally connected to said center cultivating gang and operative connections between the outer ends of said equalizing member and both of said rock shafts, and operative connections between said rock shafts and said clutch shaft for raising and lowering all of said gangs with respect to said tractor.

23. The combination with a tractor, front steering means, rear traction means, a motor, of power take-off shaft, a clutch shaft adapted to be intermittently driven by said motor, cranks secured to the opposite ends of said clutch shaft and located on the opposite sides of said tractor, spaced apart implement supporting beams arranged transversely with respect to said tractor and located between said front steering and rear traction means, a plurality of cultivating gangs carried by said implement supporting beams, parallel link mechanism pivotally connecting the forward ends of said cultivating gangs with said front supporting beam, rock shafts pivoted on said rear transverse supporting beam, operative connections between said rock shafts and said outside cultivating gangs, an equalizing member having an intermediate portion thereof pivotally connected to the center cultivating gang, operative connections between each of said rock shafts and the outer ends of said equalizing member, sectors secured to the opposite sides of said tractor on said rear supporting beam, hand adjusting levers pivoted to said sectors, slotted levers pivoted to said sectors, link connections between said slotted levers and said first named cranks, adjustable link connections between said rock shafts and said slotted levers, and means for connecting said hand levers with said last named links whereupon the adjustment of either of said levers to a predetermined position, said cranks may be rendered inoperative to lower the corresponding cultivating gangs into ground engaging position.

24. The combination with a tractor including front steering means, rear traction means, a motor, of a power take-off shaft, a clutch shaft located substantially in the transverse center of the tractor and intermittently driven by said motor, earth working units carried by and having their rear ends extending to substantially the transverse center of said tractor, positively driven connections between the rear ends of said units and said clutch shaft, and manually operable means interposed between said connections for raising said units from ground engaging position to inoperative position independent of said power lift mechanism.

25. The combination with a tractor including front steering means, rear traction means, a motor, of a power take-off shaft, a clutch shaft located substantially in the transverse center of said tractor and intermittently driven by said motor, earth working units carried by said tractor and having their rear ends extending substantially to the transverse center of said tractor, positively driven connections between said units and said clutch shaft, and manually operable levers located on the opposite sides of said tractor and operatively connected to said connections for manually lowering said units from elevated position to ground engaging position independently of said power lift mechanism.

26. The combination with a tractor including front steering means, rear traction means, a motor, of a power take-off shaft driven by said motor, a clutch shaft intermittently driven by said power take-off shaft, vertically adjustable earth working units carried by said tractor, means connecting said earth working units with said clutch shaft, and adjustable means for controlling the depth penetration of said earth working units, said last named means operable to render said clutch shaft substantially ineffective to lower said earth working units.

27. The combination with a tractor including front steering means and rear traction means, a motor, of a clutch shaft intermittently driven by said motor, vertically adjustable earth working units carried by said tractor, means for connecting said earth working units with said clutch shaft, and operable means mounted on said tractor for controlling the depth penetration of said earth working units, said last named means operable to render said clutch shaft substantially ineffective to lower said earth working units.

28. The combination with a tractor including front steering means, rear traction means, a motor, of a power take-off shaft, a clutch shaft intermittently driven by said motor, earth working units carried by said tractor, positively driven relatively short connections between the rear ends of said units and said clutch shaft, and manually operable means interposed between said connections for raising said units from ground engaging position to inoperative position independent of said clutch shaft, said means adapted to reduce the leverage to render said clutch shaft substantially ineffective to lower said earth working units into ground engaging position.

29. The combination with a tractor including front steering means, rear traction means, a motor, of a power take-off shaft driven by said motor, a clutch shaft intermittently driven by said power take-off shaft, vertically adjustable earth working units carried by said tractor, means connecting said earth working units with said clutch shaft, and an adjustable lever mounted on said tractor and operatively connected to said first named means for controlling the depth penetration of said earth working units, said lever being operable to render said clutch shaft substantially ineffective to lower said earth working units.

HERMAN E. ALTGELT.